United States Patent
Burkhardt et al.

(10) Patent No.: US 10,673,096 B2
(45) Date of Patent: Jun. 2, 2020

(54) NONAQUEOUS ELECTROLYTE COMPOSITIONS COMPRISING SULTONE AND FLUORINATED SOLVENT

(71) Applicant: Solvay SA, Brussels (BE)

(72) Inventors: Stephen E. Burkhardt, Wilmington, DE (US); Kostantinos Kourtakis, Media, PA (US); Jun J. Liu, Wilmington, DE (US); Mark Gerrit Roelofs, Earleville, MD (US); Sang-Hwan Kim, Wilmington, DE (US)

(73) Assignee: Solvay SA, Brussels (BE)

( * ) Notice: Subject to any disclaimer, the term of this patent is extended or adjusted under 35 U.S.C. 154(b) by 84 days.

(21) Appl. No.: 15/503,794

(22) PCT Filed: Aug. 12, 2015

(86) PCT No.: PCT/US2015/044844
§ 371 (c)(1),
(2) Date: Feb. 14, 2017

(87) PCT Pub. No.: WO2016/025589
PCT Pub. Date: Feb. 18, 2016

(65) Prior Publication Data
US 2017/0250445 A1 Aug. 31, 2017

Related U.S. Application Data

(60) Provisional application No. 62/037,246, filed on Aug. 14, 2014.

(51) Int. Cl.
| | | |
|---|---|---|
| *H01M 10/0569* | (2010.01) | |
| *H01M 6/16* | (2006.01) | |
| *H01M 4/505* | (2010.01) | |
| *H01M 4/525* | (2010.01) | |
| *H01M 4/587* | (2010.01) | |
| *H01M 10/0525* | (2010.01) | |
| *H01M 10/0567* | (2010.01) | |
| *H01M 10/0568* | (2010.01) | |

(52) U.S. Cl.
CPC ....... *H01M 10/0569* (2013.01); *H01M 4/505* (2013.01); *H01M 4/525* (2013.01); *H01M 4/587* (2013.01); *H01M 6/164* (2013.01); *H01M 10/0525* (2013.01); *H01M 10/0567* (2013.01); *H01M 10/0568* (2013.01); *H01M 2300/004* (2013.01); *H01M 2300/0028* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 5,738,957 A | 4/1998 | Amine et al. | |
| 6,465,135 B1 * | 10/2002 | Nishimura | H01B 1/122 |
| | | | 429/303 |
| 7,468,223 B2 | 12/2008 | Thackeray et al. | |
| 8,518,525 B2 | 8/2013 | Dennes et al. | |
| 2008/0090145 A1 * | 4/2008 | Hiwara | C09D 129/14 |
| | | | 429/188 |
| 2009/0253048 A1 * | 10/2009 | Shima | C07C 69/96 |
| | | | 429/338 |
| 2010/0035162 A1 * | 2/2010 | Chiga | H01M 10/052 |
| | | | 429/343 |
| 2010/0266905 A1 † | 10/2010 | Jeon | |
| 2011/0256455 A1 * | 10/2011 | Coowar | H01G 9/02 |
| | | | 429/247 |
| 2015/0014890 A1 * | 1/2015 | Xiao | H01M 4/0471 |
| | | | 264/446 |

FOREIGN PATENT DOCUMENTS

| | | |
|---|---|---|
| JP | 2010539670 A | 12/2010 |
| KR | 20090030237 A | 3/2009 |
| KR | 20140060325 A | 5/2014 |
| WO | 2009/040367 A1 | 4/2009 |
| WO | 2013/033579 A1 | 3/2013 |
| WO | 2013033579 A1 † | 3/2013 |
| WO | 2013/137351 A1 | 9/2013 |
| WO | 2013/183655 A1 | 12/2013 |
| WO | 2013/184881 A1 | 12/2013 |
| WO | 2014/080871 A1 | 5/2014 |

OTHER PUBLICATIONS

Office Action issued in Korean Application No. 10-2017-7006600, dated Apr. 17, 2018 (21 pages).
Examination Report Issued in Canadian Application No. 2,958,793; dated Mar. 13, 2018 (4 pages).
Office Action issued in Japanese Application No. 2017-508086; dated Mar. 6, 2018 (10 pages).
International Search Report issued in corresponding application No. PCT/US2015/044844 dated Dec. 22, 2015 (2 pages).
Written Opinion of the International Searching Authority issued in corresponding application No. PCT/US2015/044844 dated Dec. 22, 2015 (6 pages).

* cited by examiner
† cited by third party

*Primary Examiner* — Alix E Eggerding
(74) *Attorney, Agent, or Firm* — Osha Liang LLP

(57) ABSTRACT

Described are electrolyte compositions comprising a fluorinated solvent, an organic carbonate, a sultone, and optionally a borate. The fluorinated solvent may be a fluorinated acyclic carboxylic acid ester, a fluorinated acyclic carbonate, a fluorinated acyclic ether, or mixtures thereof. The organic carbonate may be fluorinated or non-fluorinated. The electrolyte compositions are useful in electrochemical cells, such as lithium ion batteries.

19 Claims, No Drawings

NONAQUEOUS ELECTROLYTE COMPOSITIONS COMPRISING SULTONE AND FLUORINATED SOLVENT

CROSS-REFERENCE TO RELATED APPLICATION

This application claims benefit of U.S. Provisional Application No. 62/037,246, filed Aug. 14, 2014, which is incorporated herein by reference in its entirety.

TECHNICAL FIELD

The disclosure herein relates to electrolyte compositions containing a fluorinated solvent and a sultone, which are useful in electrochemical cells, such as lithium ion batteries. The electrolyte composition may additionally comprise a borate such as lithium bis(oxalato)borate.

BACKGROUND

With the advancement in portable electronic devices and intense interest in plug-in hybrid electric vehicles, there is great demand to increase the energy and power capabilities of lithium ion batteries. In this regard, increasing the operational voltage is a viable strategy. Current lithium ion battery electrolyte solvents typically contain one or more linear carbonates, such as ethyl methyl carbonate, dimethyl carbonate, or diethyl carbonate; and a cyclic carbonate, such as ethylene carbonate. However, at cathode potentials above 4.2 V these electrolytes can decompose, which can result in a loss of battery performance. Electrolyte decomposition can also occur, generating gas which can cause swelling of the battery. What is needed is an electrolyte formulation which combines solvent(s) with additive(s) and can minimize gas formation but also provide good battery performance characteristics.

SUMMARY

In one embodiment there is provided an electrolyte composition comprising:
a) a fluorinated solvent;
b) an organic carbonate;
c) a sultone, saturated or unsaturated, which is optionally substituted with one or more halogen, aryl, or linear, branched or cyclic, saturated or unsaturated alkyl groups; and
d) at least one electrolyte salt.

In one embodiment, the fluorinated solvent is:
a) a fluorinated acyclic carboxylic acid ester represented by the formula:

b) a fluorinated acyclic carbonate represented by the formula:

or c) a fluorinated acyclic ether represented by the formula:

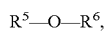

or a mixture thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In one embodiment, the sultone is represented by the formula:

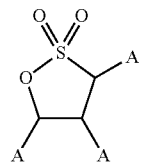

wherein each A is independently a hydrogen, fluorine, or an optionally fluorinated alkyl, vinyl, allyl, acetylenic, or propargyl group.

In some embodiments, the organic carbonate comprises a non-fluorinated carbonate. In some embodiments, the organic carbonate comprises a fluorinated carbonate. In some embodiments, the sultone comprises 1,3-propane sultone. In some embodiments, the electrolyte composition further comprises a borate selected from the group consisting of lithium bis(oxalato)borate, lithium difluoro(oxalato) borate, lithium tetrafluoroborate, and mixtures thereof.

In another embodiment, there is provided an electrochemical cell comprising:
(a) a housing;
(b) an anode and a cathode disposed in said housing and in ionically conductive contact with one another;
(c) an electrolyte composition as disclosed herein, disposed in said housing and providing an ionically conductive pathway between said anode and said cathode; and
(d) a porous separator between said anode and said cathode.

In another embodiment, there is provided an electronic device, transportation device, or telecommunications device comprising the electrochemical cell as disclosed herein.

In a further embodiment, the electrochemical cell is a lithium ion battery.

DETAILED DESCRIPTION

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value ($Li/Li^+$). The potential of such a $Li/Li^+$ reference electrode is assigned here the value of 0.0V. Potential of an anode or cathode means the potential difference between the anode or cathode and that of a $Li/Li^+$ reference electrode. Herein voltage means the voltage difference between the cathode and the anode of a cell, neither electrode of which may be operating at a potential of 0.0V.

The term "carbonate" as used herein refers specifically to an organic carbonate, wherein the organic carbonate is a dialkyl diester derivative of carbonic acid, the organic carbonate having a general formula R'OCOOR", wherein R' and R" are each independently selected from alkyl groups having at least 1 carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

The term "alkyl group", as used herein, refers to a linear or branched chain hydrocarbon group containing no unsaturation.

The term "fluoroalkyl group", as used herein, refers to an alkyl group wherein at least one hydrogen is replaced by fluorine.

Disclosed herein are electrolyte compositions comprising:
  a) a fluorinated solvent;
  b) an organic carbonate;
  c) a sultone, saturated or unsaturated, which is optionally substituted with one or more halogen, aryl, or linear, branched or cyclic, saturated or unsaturated alkyl groups; and
  d) at least one electrolyte salt.

As used herein, the terms "organic carbonate" and "fluorinated solvent" refer to different, that is, not the same chemical compounds of the electrolyte composition.

One or more organic carbonates may be used in the electrolyte composition. Suitable organic carbonates include fluoroethylene carbonate, ethylene carbonate, ethyl methyl carbonate, difluoroethylene carbonate isomers, trifluoroethylene carbonate isomers, tetrafluoroethylene carbonate, dimethyl carbonate, diethyl carbonate, propylene carbonate, vinylene carbonate, 2,2,3,3-tetrafluoropropyl methyl carbonate, bis(2,2,3,3-tetrafluoropropyl) carbonate, bis(2,2,2-trifluoroethyl) carbonate, 2,2,2-trifluoroethyl methyl carbonate, bis(2,2-difluoroethyl) carbonate, 2,2-difluoroethyl methyl carbonate, dipropyl carbonate, methyl propyl carbonate, ethyl propyl vinylene carbonate, methyl butyl carbonate, ethyl butyl carbonate, propyl butyl carbonate, dibutyl carbonate, vinylethylene carbonate, dimethylvinylene carbonate, methyl 2,3,3-trifluoroallyl carbonate, or mixtures thereof.

In one embodiment the organic carbonate comprises a non-fluorinated carbonate. One or more non-fluorinated carbonates, or a mixture of one or more organic carbonates with one or more non-fluorinated carbonates, may be used in the electrolyte composition. Suitable non-fluorinated carbonates include ethylene carbonate, ethyl methyl carbonate, dimethyl carbonate, diethyl carbonate, vinylene carbonate, di-tert-butyl carbonate, vinylethylene carbonate, dimethylvinylene carbonate, propylene carbonate, dipropyl carbonate, methyl propyl carbonate, ethyl propyl vinylene carbonate, methyl butyl carbonate, ethyl butyl carbonate, propyl butyl carbonate, or mixtures thereof. In one embodiment, the non-fluorinated carbonate comprises ethylene carbonate, ethyl methyl carbonate, dimethyl carbonate, diethyl carbonate, vinylene carbonate, propylene carbonate, or mixtures thereof. In one embodiment, the non-fluorinated carbonate comprises ethylene carbonate. In one embodiment, the non-fluorinated carbonate comprises dimethyl carbonate.

In one embodiment the organic carbonate is a cyclic carbonate. Suitable cyclic carbonates include fluoroethylene carbonate, ethylene carbonate, difluoroethylene carbonate isomers, trifluoroethylene carbonate isomers, tetrafluoroethylene carbonate, propylene carbonate, vinylene carbonate, ethyl propyl vinylene carbonate, vinylethylene carbonate, dimethylvinylene carbonate, or mixtures thereof. In one embodiment the fluorinated cyclic carbonate comprises fluoroethylene carbonate, which is also known as 4-fluoro-1,3-dioxolan-2-one. In one embodiment, the organic carbonate comprises 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; or mixtures thereof.

In one embodiment the organic carbonate comprises a non-fluorinated cyclic carbonate. Suitable a non-fluorinated cyclic carbonates include ethylene carbonate, propylene carbonate, vinylene carbonate, ethyl propyl vinylene carbonate, vinylethylene carbonate, dimethylvinylene carbonate, or mixtures thereof. In one embodiment the non-fluorinated cyclic carbonate is ethylene carbonate. In another embodiment the non-fluorinated cyclic carbonates comprise a mixture of ethylene carbonate and vinylene carbonate, wherein the vinylene carbonate comprises 0.2 to 3 weight percent of the weight of the formulated electrolyte.

In one embodiment the organic carbonate comprises a fluorinated carbonate. Suitable fluorinated carbonates include 4-fluoroethylene carbonate, difluoroethylene carbonate isomers, trifluoroethylene carbonate isomers, tetrafluoroethylene carbonate, 2,2,3,3-tetrafluoropropyl methyl carbonate, bis(2,2,3,3-tetrafluoropropyl) carbonate, bis(2,2,2-trifluoroethyl) carbonate, 2,2,2-trifluoroethyl methyl carbonate, bis(2,2-difluoroethyl) carbonate, 2,2-difluoroethyl methyl carbonate, or methyl 2,3,3-trifluoroallyl carbonate, or mixtures thereof. In one embodiment the fluorinated carbonate comprises fluoroethylene carbonate. In one embodiment, the fluorinated carbonate comprises 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; or mixtures thereof.

In the electrolyte compositions disclosed herein, the organic carbonate or mixtures thereof can be used in various amounts depending on the desired properties of the electrolyte composition. In one embodiment, the organic carbonate(s) in combination comprises about 0.5 percent to about 95 percent by weight of the electrolyte composition, or about 5 percent to about 95 percent, or about 10 percent to about 80 percent by weight of the electrolyte composition, or about, 20 percent to about 40 percent by weight of the electrolyte composition, or about 25 percent to about 35 percent by weight of the electrolyte composition. In another embodiment, the organic carbonate(s) comprises about 0.5 percent to about 10 percent by weight of the electrolyte composition, or about 1 percent to about 10 percent, or about 5 percent to about 10 percent by weight.

The fluorinated solvent may be a fluorinated acyclic carboxylic acid ester, a fluorinated acyclic carbonate, a fluorinated acyclic ether, or mixtures thereof. One or more fluorinated solvents may be used in the electrolyte composition.

Suitable fluorinated acyclic carboxylic acid esters are represented by the formula

wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$-group or a —FCH- group.

In one embodiment, the number of carbon atoms in $R^1$ in the formula above is 1, 3, 4, or 5.

Examples of suitable fluorinated acyclic carboxylic acid esters include without limitation $CH_3$—COOO—$CH_2CF_2H$ (2,2-difluoroethyl acetate, CAS No. 1550-44-3), $CH_3$—COOO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $HCF_2$—$CH_2$—$CH_2$—COO—$CH_2CH_3$ (ethyl 4,4-difluorobutanoate, CAS No. 1240725-43-2), $CH_3$—COO—$CH_2CF_3$ (2,2,2-trifluoroethyl acetate, CAS No. 406-95-1), H—COO—$CH_2CF_2H$ (difluoroethyl formate, CAS No. 1137875-58-1), H—COO—$CH_2CF_3$ (trifluoroethyl formate, CAS No. 32042-38-9), and mixtures thereof. In one embodiment, the fluorinated acyclic carboxylic acid ester comprises 2,2-difluoroethyl acetate ($CH_3$—COO—$CH_2CF_2H$). In one embodiment, the fluorinated acyclic carboxylic acid ester comprises 2,2-difluoroethyl propionate ($CH_3CH_2$—COO—$CH_2CF_2H$). In one embodiment, the fluorinated acyclic carboxylic acid ester comprises 2,2,2-trifluoroethyl acetate ($CH_3$—COO—$CH_2CF_3$). In one embodiment, the fluorinated acyclic carboxylic acid ester comprises 2,2-difluoroethyl formate (H—COO—$CH_2CF_2H$).

Suitable fluorinated acyclic carbonates are represented by the formula:

wherein
i) $R^3$ is a fluoroalkyl group;
ii) $R^4$ is an alkyl group or a fluoroalkyl group; and
iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ and $R^4$ independently can be branched or linear. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a $FCH_2$-group or a —FCH- group.

Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (2,2-difluoroethyl ethyl carbonate, CAS No. 916678-14-3), and $CF_3CH_2$—OCOO—$CH_2CH_3$ (2,2,2-trifluoroethyl ethyl carbonate, CAS No. 156783-96-9).

Suitable fluorinated acyclic ethers are represented by the formula:

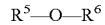

wherein
i) $R^5$ is a fluoroalkyl group;
ii) $R^6$ is an alkyl group or a fluoroalkyl group; and
iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ and $R^6$ independently can be branched or linear. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a $FCH_2$-group or a —FCH- group.

Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. As used herein, the term "mixture" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate, or a mixture of 2,2-difluoroethyl acetate and 2,2 difluoroethyl methyl carbonate.

In one embodiment, the fluorinated solvent is:
a) a fluorinated acyclic carboxylic acid ester represented by the formula:

b) a fluorinated acyclic carbonate represented by the formula:

$R^3$—OCOO—$R^4$, c) a fluorinated acyclic ether represented by the formula:

$R^5$—O—$R^6$, or a mixture thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
a) a fluorinated acyclic carboxylic acid ester represented by the formula:

$R^1$—COO—$R^2$, b) a fluorinated acyclic carbonate represented by the formula:

$R^3$—OCOO—$R^4$, c) a fluorinated acyclic ether represented by the formula:

$R^5$—O—$R^6$, or a mixture thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a FCH$_2$-group or a —FCH-group.

In the electrolyte compositions disclosed herein, the fluorinated solvent or mixtures thereof can be used in various amounts depending on the desired properties of the electrolyte composition. In one embodiment, the fluorinated solvent comprises from about 1% to about 95% by weight of the electrolyte composition. In another embodiment, the fluorinated solvent comprises about 5% to about 95% by weight of the electrolyte composition. In yet another embodiment, the fluorinated solvent comprises about 10% to about 90% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition. In another embodiment, the fluorinated solvent comprises about 20% to about 45% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of HCF$_2$CF$_2$CH$_2$—O—CF$_2$CF$_2$H can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields HCF$_2$CH$_2$—O—CF$_2$CF$_2$H. Alternatively, some of the fluorinated solvents disclosed herein may be obtained commercially, for example from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. The fluorinated solvents disclosed herein may be purified using distillation methods such as vacuum distillation or spinning band distillation.

The electrolyte compositions disclosed herein also comprise a sultone, saturated or unsaturated, which is optionally substituted with one or more halogen, aryl, or linear, branched, or cyclic, saturated or unsaturated alkyl groups. Mixtures of two or more of sultones may also be used. In one embodiment the sultone is saturated, that is, the sultone ring does not contain an unsaturated bond. In another embodiment the sultone is unsaturated, that is, the sultone ring contains an unsaturated bond.

In one embodiment the sultone is represented by the formula:

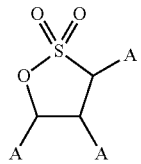

wherein each A is independently a hydrogen, fluorine, or an optionally fluorinated alkyl, vinyl, allyl, acetylenic, or propargyl group. The vinyl (H$_2$C=CH—), allyl (H$_2$C=CH—CH$_2$—), acetylenic (HCEC—), or propargyl (HCEC—CH$_2$—) groups may each be unsubstituted or partially or totally fluorinated. Each A can be the same or different as one or more of the other A groups, and two or three of the A groups can together form a ring. Mixtures of two or more of sultones may also be used. Suitable sultones include 1,3-propane sultone, 3-fluoro-1,3-propane sultone, 4-fluoro-1,3-propane sultone, 5-fluoro-1,3-propane sultone, and 1,8-naphthalenesultone. In one embodiment, the sultone comprises 1,3-propane sultone. In one embodiment, the sultone comprises 3-fluoro-1,3-propane sultone.

In one embodiment the sultone is present at about 0.01 to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

The electrolyte compositions disclosed herein may optionally further comprise a borate selected from the group consisting of lithium bis(oxalato)borate, lithium difluoro (oxalato)borate, lithium tetrafluoroborate, and mixtures thereof. In some embodiments, the electrolyte composition further comprises lithium bis(oxalato)borate. In other embodiments, the electrolyte composition further comprises lithium difluoro(oxalato)borate. In some embodiments, the electrolyte composition further comprises lithium tetrafluoroborate. In one embodiment the borate is present in the electrolyte composition in the range of from about 0.01 to about 10 percent by weight, based on the total weight of the electrolyte composition, for example in the range of from about 0.1 to about 5 percent by weight, or from about 0.5 percent by weight to about 3 percent by weight, or about 1 percent by weight to about 3 percent by weight, or about 1.5 percent by weight to about 2.5 percent by weight, or about 2 percent by weight, of the total electrolyte composition.

In one embodiment, the electrolyte composition comprises 2,2-difluoroethyl acetate, at least one fluorinated carbonate, and 1,3-propane sultone. In one embodiment, the electrolyte composition comprises 2,2-difluoroethyl acetate, at least one non-fluorinated carbonate, and 1,3-propane sultone. In one embodiment, the electrolyte composition comprises 2,2-difluoroethyl acetate, at least one fluorinated carbonate, at least one non-fluorinated carbonate, and 1,3-propane sultone. In one embodiment, the electrolyte composition comprises 2,2-difluoroethyl acetate, ethylene carbonate, and 1,3-propane sultone, and further comprises lithium bis(oxalato)borate. In one embodiment, the electrolyte composition comprises 2,2-difluoroethyl acetate, 4-fluoroethylene carbonate, and 1,3-propane sultone. In one embodiment, the electrolyte composition comprises 2,2-difluoroethyl acetate, 4-fluoroethylene carbonate, 2,2-difluoroethyl methyl carbonate, and 1,3-propane sultone. In one embodiment, the electrolyte composition comprises 2,2-difluoroethyl methyl carbonate, 4-fluoroethylene carbonate, and 1,3-propane sultone. In one embodiment, the electrolyte composition comprises 2,2-difluoroethyl acetate, ethylene carbonate, and 1,3-propane sultone, and optionally further comprises lithium bis(oxalato)borate. In one embodiment, the electrolyte composition comprises 2,2-difluoroethyl methyl carbonate, ethylene carbonate, and 1,3-propane sultone.

In one embodiment, the electrolyte composition comprises about 0.01 weight percent to about 10 weight percent of the sultone, and about 10 weight percent to about 80 weight percent of the fluorinated solvent, based on the total weight of the electrolyte composition. In some embodiments, the electrolyte composition comprises about 1 percent to about 90 percent, or about 10 percent to about 90 percent, or about 20 percent to about 80 percent, of 2,2-difluoroethyl acetate; about 1 percent to about 65 percent, or about 5 percent to about 50 percent, of ethylene carbonate or fluoroethylene carbonate, and about 0.01 percent to about 10 percent, or about 0.1 percent to about 10 percent, 1,3-propane sultone, based on the total weight of the electrolyte composition. In some embodiments, the electrolyte composition further comprises about 0.01 percent to about 15 percent by weight of the electrolyte composition, or about 0.1 percent to about 15 percent by weight of the electrolyte composition, of a borate selected from the group consisting of lithium bis(oxalato)borate, lithium difluoro(oxalato)borate, lithium tetrafluroborate, and mixtures thereof. In some embodiments, the electrolyte composition further comprises about 0.5 percent to about 60 percent, or about 1 percent to about 50 percent, 2,2-difluoroethyl methyl carbonate by weight of the electrolyte composition.

The electrolyte compositions disclosed herein also contain at least one electrolyte salt. Suitable electrolyte salts include without limitation lithium hexafluorophosphate ($LiPF_6$), lithium bis(trifluromethyl)tetrafluorophosphate ($LiPF_4(CF_3)_2$), lithium bis(pentafluoroethyl)tetrafluorophosphate ($LiPF_4(C_2F_5)_2$), lithium tris(pentafluoroethyl)trifluorophosphate ($LiPF_3(C_2F_5)_3$), lithium bis(trifluoromethanesulfonyl)imide, lithium bis(perfluoroethanesulfonyl)imide, lithium (fluorosulfonyl) (nonafluorobutanesulfonyl)imide, lithium bis(fluorosulfonyl)imide, lithium tetrafluoroborate, lithium perchlorate, lithium hexafluoroarsenate, lithium trifluoromethanesulfonate, lithium tris(trifluoromethanesulfonyl)methide, lithium bis(oxalato)borate, lithium difluoro(oxalato)borate, $Li_2B_{12}F_{12-x}H_x$ where x is equal to 0 to 8, and mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

Electrolyte compositions disclosed herein can optionally comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight percent to about 10 weight percent, alternatively from about 0.05 weight percent to about 5 weight percent of the electrolyte composition, or alternatively from about 0.5 weight percent to about 2 weight percent of the electrolyte composition.

Suitable gas-reduction additives that are known conventionally include, for example: halobenzenes such as fluorobenzene, chlorobenzene, bromobenzene, iodobenzene, or haloalkylbenzenes;

succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-l,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bis-trifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid such as lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described herein above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can from on the anode and cathode.

In another embodiment, the electrochemical cell is a lithium ion battery. Suitable cathode materials for a lithium ion battery include without limitation electroactive compounds comprising lithium and transition metals, such as $LiCoO_2$, $LiNiO_2$, $LiMn_2O_4$, $LiCo_{0.2}Ni_{0.2}O_2$ or $LiV_3O_8$;

$Li_aCoG_bO_2$ (0.90≤a≤1.8, and 0.001≤b≤0.1);

$Li_aNi_bMn_cCo_dR_eO_{2-f}Z_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;

$Li_aA_{1-b}R_bD_2$ (0.90≤a≤1.8 and 0≤b≤0.5);

$Li_aE_{1-b}R_bO_{2-c}D_c$ (0.90≤a≤1.8, 0≤b≤0.5 and 0≤c≤0.05);

$Li_aNi_{1-b-c}Co_bR_cO_{2-d}Z_d$ where 0.9≤a≤1.8, 0≤b≤0.4, 0≤c≤0.05, and 0≤d≤0.05;

$Li_{1+z}Ni_{1-x-y}Co_xAl_yO_2$ where 0<x<0.3, 0<y<0.1, and 0<z<0.06;

$LiNi_{0.5}Mn_{1.5}O_4$; $LiFePO_4$, $LiMnPO_4$, $LiCoPO_4$, and $LiVPO_4F$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc. In another embodiment the cathode material is an NMC cathode; that is, a LiNiMnCoO cathode, more specifically, cathodes in which the atomic ratio of Ni:Mn:Co is 1:1:1 ($Li_aNi_{1-b-c}Co_bR_cO_{2-d}Z_d$ where 0.98≤a≤1.05, 0≤d≤0.05, b=0.333, c=0.333, where R comprises Mn) or where the atomic ratio of Ni:Mn:Co is 5:3:2 ($Li_aNi_{1-b-c}Co_bR_cO_{2-d}Z_d$ where 0.98≤a≤1.05, 0≤d≤0.05, c=0.3, b=0.2, where R comprises Mn).

In another embodiment, the cathode in the lithium ion battery disclosed herein comprises a composite material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and 0.9≤a≤1.2, 1.3≤b≤2.2, 0≤c≤0.7, 0≤d≤0.4.

In another embodiment, the cathode in the lithium ion battery disclosed herein comprises a cathode active material exhibiting greater than 30 mAh/g capacity in the potential range greater than 4.6 V versus a $Li/Li^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium ion battery disclosed herein comprises a composite material represented by the structure of Formula:

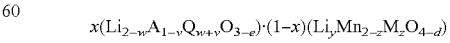

wherein:

x is about 0.005 to about 0.1;

A comprises one or more of Mn or Ti;

Q comprises one or more of Al, Ca, Co, Cr, Cu, Fe, Ga, Mg, Nb, Ni, Ti, V, Zn, Zr or Y;

e is 0 to about 0.3;

v is 0 to about 0.5.

w is 0 to about 0.6;

M comprises one or more of Al, Ca, Co, Cr, Cu, Fe, Ga, Li, Mg, Mn, Nb, Ni, Si, Ti, V, Zn, Zr or Y;

d is 0 to about 0.5;

y is about 0 to about 1; and z is about 0.3 to about 1; and wherein the $Li_yMn_{2-z}M_zO_{4-d}$ component has a spinel structure and the $Li_{2-w}Q_{w+v}A_{1-v}O_{3-e}$ component has a layered structure.

In another embodiment, in the Formula $$x(Li_{2-w}A_{1-v}Q_{w+v}O_{3-e}) \cdot (1-x)(Li_yMn_{2-z}M_zO_{4-d})$$

x is about 0 to about 0.1, and all ranges for the other variables are as stated herein above.

In another embodiment, the cathode in the lithium ion battery disclosed herein comprises $$Li_aA_{1-x}R_xDO_{4-f}Z_f$$

wherein:

A is Fe, Mn, Ni, Co, V, or a combination thereof;

R is Al, Ni, Co, Mn, Cr, Fe, Mg, Sr, V, Zr, Ti, a rare earth element, or a combination thereof;

D is P, S, Si, or a combination thereof;

Z is F, Cl, S, or a combination thereof;

$0.8 \le a \le 2.2$;

$0 \le x \le 0.3$; and $0 \le f \le 0.1$.

In another embodiment, the cathode in the lithium ion battery disclosed herein comprises a cathode active material which is charged to a potential greater than or equal to about 4.1 V, or greater than or equal to 4.35 V, or greater than 4.5 V, or greater than or equal to 4.6 V versus a $Li/Li^+$ reference electrode. Other examples are layered-layered high-capacity oxygen-release cathodes such as those described in U.S. Pat. No. 7,468,223 charged to upper charging potentials above 4.5 V.

A cathode active material suitable for use herein can be prepared using methods such as the hydroxide precursor method described by Liu et al (J. Phys. Chem. C 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH.H_2O$ at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation silicon, lithium metal, lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$, nanocomposites containing antimony or tin, for example nanocomposites containing antimony, oxides of aluminum, titanium, or molybdenum, and carbon, such as those described by Yoon et al (Chem. Mater. 21, 3898-3904, 2009); and lithium titanates such as $Li_4Ti_5O_{12}$ and $LiTi_2O_4$. In one embodiment, the anode active material is lithium titanate, graphite, lithium alloys, silicon, or combinations thereof. In another embodiment, the anode is graphite.

An anode can be made by a method similar to that described above for a cathode wherein, for example, a binder such as a vinylidene fluoride-based copolymer, styrene-butadiene copolymer, or carboxymethyl cellulose is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi Chemical (Ibaraki, Japan), NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. Patent Application Publication No. 2012/0149852, now U.S. Pat. No. 8,518,525.

The housing of the lithium ion battery hereof may be any suitable container to house the lithium ion battery components described above. Such a container may be fabricated in the shape of small or large cylinder, a prismatic case or a pouch.

The electrolyte compositions disclosed herein are useful in many types of electrochemical cells and batteries such as capacitors, nonaqueous batteries such as lithium batteries, flow batteries, and fuel cells.

The electrochemical cells and lithium ion battery disclosed herein may be used for grid storage or as a power source in various electronically-powered or -assisted devices ("electronic device") such as a computer, a camera, a radio or a power tool, various telecommunications devices, or various transportation devices (including a motor vehicle, automobile, truck, bus, or airplane).

In another embodiment there is a provided a method comprising combining:

a) a fluorinated solvent;

b) an organic carbonate;

c) a sultone, saturated or unsaturated, which is optionally substituted with one or more halogen, aryl, or linear, branched, or cyclic, saturated or unsaturated alkyl groups; and d), at least one electrolyte salt; to form an electrolyte composition;

wherein the fluorinated solvent is:

A) a fluorinated acyclic carboxylic acid ester represented by the formula:

$R^1$—COO—$R^2$,

B) a fluorinated acyclic carbonate represented by the formula:

$R^3$—OCOO—$R^4$,

C) a fluorinated acyclic ether represented by the formula:

$R^5$—O—$R^6$, or a mixture thereof;
wherein
  i) $R^1$ is H, an alkyl group, or a fluoroalkyl group;
  ii) $R^3$ and $R^5$ is each independently a fluoroalkyl group and can be either the same as or different from each other;
  iii) $R^2$, $R^4$, and $R^6$ is each independently an alkyl group or a fluoroalkyl group and can be either the same as or different from each other;
  iv) either or both of $R^1$ and $R^2$ comprises fluorine; and
  v) $R^1$ and $R^2$, $R^3$ and $R^4$, and $R^5$ and $R^6$, each taken as a pair, comprise at least two carbon atoms but not more than seven carbon atoms.
The components can be combined in any suitable order.

In another embodiment there is provided a method for reducing gas formation in a lithium ion battery, the method comprising:
  (a) preparing the electrolyte composition of claim 1;
  (b) placing the electrolyte composition in a lithium ion battery comprising
    (i) a housing;
      (ii) an anode and a cathode disposed in said housing and in ionically conductive contact with one another; and
    (iii) a porous separator between said anode and said cathode;
whereby the electrolyte composition provides an ionically conductive pathway between said anode and said cathode;
  (c) forming the lithium ion battery; and
  (d) charging and discharging the lithium ion battery at least once.

As used herein, the term "forming the lithium ion battery" refers to preconditioning the battery by known methods, including, for example, as disclosed in the following Examples.

EXAMPLES

The concepts disclosed herein are illustrated in the following Examples. From the above discussion and these Examples, one skilled in the art can ascertain the essential characteristics of the concepts disclosed herein, and without departing from the spirit and scope thereof, can make various changes and modifications to adapt to various uses and conditions.

The meaning of abbreviations used is as follows: "g" means gram(s), "mg" means milligram(s), "μg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "kV" means kilovolt(s), "eV" means electronvolt(s), "keV" means kiloelectronvolts, "xC" refers to a constant current which is the product of x and a current in A which is numerically equal to the nominal capacity of the battery expressed in Ah, "Pa" means pascal(s), "kPa" means kilopascal(s), "rpm" means revolutions per minute, "psi" means pounds per square inch, "NMR" means nuclear magnetic resonance spectroscopy, "GC/MS" means gas chromatography/mass spectrometry, "Ex" means Example and "Comp. Ex" means Comparative Example.

Materials and Methods
Representative Preparation of 2,2-difluoroethyl Acetate

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HPSMS, phenyl-methyl siloxane, Agilent 19091S-433, 30 m, 250 μm, 0.25 μm; carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Lithium bis(oxalato)borate Purification (LiBOB)

In a nitrogen purged dry box, lithium bis(oxalato)borate (LiBOB, Sigma-Aldrich, Milwaukee, Wis.) was purified by the following procedure. 11.25 g of LiBOB was added to a 400 mL beaker with 50 mL anhydrous acetonitrile. The mixture was stirred and heated to 40° C. for about 30 minutes. The warm mixture was filtered through a Whatman #1 filter and transferred into a second beaker and allow to cool to room temperature. A clear solution was obtained. To this clear solution, about 50 mL of cold anhydrous toluene (−30° C.) was added. This was stirred for an additional 30 minutes to form a precipitate. The solution was filtered through a Whatman #1 filter and the filter cake was washed again with the cold anhydrous toluene. After allowing the filter cake to dry on the vacuum filtration funnel, the solids were removed from the dry box and placed in a vacuum oven at 130° C. and dried with a slight nitrogen purge for 15 hours to form the final product, which was subsequently handled in the nitrogen purged drybox.

Synthesis of 3-Fluoro-1,3-propanesultone (FPS) (J. Mater. Chem. A, 2013, 1, 11975/KR10-0908570B1 2009) 3-Chloro-1,3-propanesultone

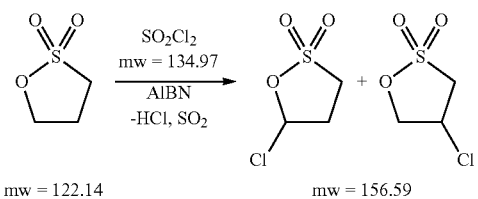

mw = 122.14    mw = 156.59

In a 250-mL 3-neck RB with a condenser 25 g 1,3-propanesultone (0.20 mol; mp=30° C.; bp=180° C./30 torr; D=1.39; ≥99% Aldrich 291250) was magnetically stirred in a 80° C. oil bath under nitrogen. Sulfuryl chloride (22 mL; 36.6 g; 0.27 mol; mw=134.97; bp=68° C.; D=1.67; Aldrich 157767) was added dropwise over 2.25 hr down the condenser mouth through PTFE tubing using a syringe pump at 0.15 mL/min. A solution of 200 mg 2,2-azobisisobutyronitrile (AIBN; Vazo 64; 0.6 mmol; mw=164.21; Aldrich 441090) in 5 mL dichloromethane (DCM) was added in 0.5-mL increments at 30-min intervals during the sulfuryl chloride addition, the first AIBN addition occurring when sulfuryl chloride addition began and continued half-hourly after all the sulfuryl chloride had been added. The reaction was analyzed hourly by $^1$H NMR. A final portion of 20 mg AIBN in 0.5 mL DCM was added at 4.5 hr; after 45 min the reaction was flushed with nitrogen for ~10 minutes to evaporate off sulfuryl chloride and the mixture was allowed to cool to RT overnight.

The next day, the reaction was heated to 80° C. and a stream of nitrogen was passed through for 20 min to evaporate residual sulfuryl chloride. Then sulfuryl chloride (20 mL; 33.4 g; 0.25 mol) was added dropwise over 3.25 hr down the condenser mouth via syringe pump at 0.1 mL/min. A solution of 25 mg AIBN in 1 mL DCM was added at the beginning of sulfuryl chloride addition and subsequent additions of freshly made 25 mg AIBN in 1 mL DCM were made every 30 min for 3.5 hr. The reaction was analyzed hourly by $^1$H NMR. After 6 hr 25 mg AIBN in 1 mL DCM was added and the NMR was taken an hour later. $^1$H NMR showed only 1.5% 1,3-propane sultone remained unreacted.

| Rxn Time (hr) | % 1,3-Propanesultone (PS) | % 3-Chloro-1,3-propanesultone (3Cl) | % 2-Chloro-1,3-propanesultone (2Cl) |
|---|---|---|---|
| 1 | 67.7 | 22.7 | 9.7 |
| 2 | 35.9 | 45.5 | 18.6 |
| 3 | 23.3 | 54.8 | 21.9 |
| 4 | 22.7 | 55.2 | 22.2 |
| Reaction stopped, cooled and resumed the following day. | | | |
| 1 | 22.9 | 61.7 | 24.2 |
| 2 | 6.7 | 67.9 | 25.4 |
| 3 | 2.9 | 72.1 | 24.9 |
| 4 | 1.8 | 74.0 | 24.2 |
| 7 | 1.5 | 73.9 | 24.6 |

The reaction was cooled to room temperature after another 2 hr. The reaction mixture was rotovapped to yield 31.9 g of chloro-1,3-propanesultone as a slightly yellow liquid.

$^1$H NMR (CDCl$_3$): 2.63 ppm (quint, J=7.2 Hz, 0.12H, PS); 2.87 (d of d of d of d, J=1.3, 2.3, 7.3, 14.2 Hz, 3.1H, 3Cl); 3.14-3.22 (m, 3.1H, 3Cl); 3.44-3.51 (m, 4H, 3Cl); 3.55-3.61 (m, 3.1H); 3.84 (d of d, J=7.8, 14.1 Hz, 1H, 2Cl); 4.02-4.09 (m, 1.6H); 4.47 (d of d, J=5.2, 10.2 Hz, 1H); 4.76 (d of d, J=5.8, 10.2 Hz, 0.9H, 2Cl); 4.86 (m, 0.9H, 2Cl); 4.98 (d, J=6.0 Hz, 1.1H); 6.37 (s, 1H); 6.44 (d, J=5.1 Hz, 3H, 3Cl)

3-Fluoro-1,3-propanesultone

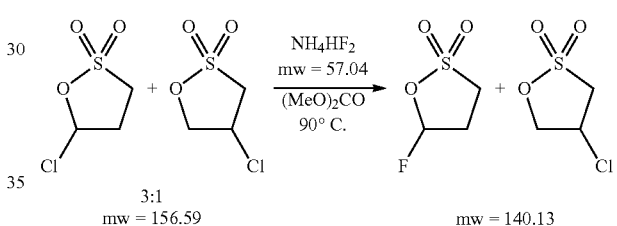

3:1
mw = 156.59    mw = 140.13

A mixture of crude chloro-1,3-propane-sultone (31.8 g; 0.20 mol; 75 wt % 3-chloro-1,3-propane-sultone), ammonium hydrogen difluoride (29 g; 0.51 mol; mw=57.04; Aldrich 224820) and dimethyl carbonate (DMC; 60 mL; Aldrich D152927) in a 200-mL RB flask with a condenser was flushed with nitrogen and stirred in a 90° C. oil bath for 15 hr. The brick-red reaction mixture was suction-filtered through Celite under nitrogen and the solids and the flask were rinsed with dichloromethane (DCM). The solids were discarded. The product filtrate was rotovapped from a warm water bath and the reddish liquid was mixed with 20 mL DCM, filtered again through Celite under nitrogen and rotovapped to afford a reddish sludge which was held under high vacuum for 24 hr, yielding 10.2 g product.

Extraction of the orange, sludgy material with 35 mL DCM, filtration through Celite and rotovapping yielded 8.6 g of white solids mixed with a brown sludge.

The solids were dissolved in 10 mL ethyl acetate. A white precipitate started to form, so the mixture was set on dry ice for 10 min. The cold mixture was suction-filtered on a glass-fritted funnel under nitrogen, rinsed with cold EtOAc and suctioned dry to yield 4.7 g of a yellowish-white powder. $^1$H NMR (CDCl$_3$): 98.0 mol % 3-fluoropropanesultone (3-FPS); 1.6 mol % EtOAc; 0.4 mol % 3-chloropropane-sultone (3-Cl PS).

The product was redissolved in 15 mL hot EtOAc and ~7 mL was evaporated off. The concentrated mixture was set on dry ice for 10 minutes to recrystallize. The mixture was filtered through a glass-fritted funnel under nitrogen and rinsed with cold EtOAc, yielding 3.0 g 3-FPS. $^1$H NMR (CDCl$_3$): 6.4 mol % EtOAc; 0.2 mol % 3-Cl PS. The mother liquor was concentrated to yield 1.0 g 3-FPS. $^1$H NMR: 5.26 mol % EtOAc; 0.26 mol % 3-Cl PS.

$^1$H NMR (CDCl$_3$): 0.88 ppm (t, J=6.9 Hz, 0.08H); 2.03 (s, 0.02H); 2.04 (s, 0.013H, EtOAc); 2.28 (s, 0.006H); 2.74-2.95 (m, 2.15H, 3-FPS); 3.40-3.43 (m, 2.00H, 3-FPS); 6.19 (d of d of d, J=0.7, 3.8, 59.0 Hz, 1.05H, 3-FPS)

$^{19}$F NMR (CDCl$_3$): −118.3 ppm (d of d of d, J=13.0, 32.6, 59.0 Hz, 1F)

Example 1-18

Comparative Examples A-E

Electrode Preparation:

The cathode paste was made from
0.52 g carbon black (Super C65, Timcal, Westlake, Ohio)
10.4 g solution of 5% pVDF (Solef 5130, Solvay, West Deptford, N.J.) in NMP (N-methylpyrrolidone (Sigma-Aldrich, Milwaukee, Wis.))
3.0 g NMP
9.36 g NMC 532 (approx. LiNi$_{0.5}$Mn$_{0.3}$Co$_{0.2}$O$_2$, Jinhe Ningbo, China)

The carbon black, PVDF solution, and NMP were first combined in a plastic vial and centrifugally mixed (ARE-310, Thinky USA, Inc., Laguna Hills, Calif.) two times for 60 s at 2000 rpm each time. The cathode active powder was added and the paste was centrifugally mixed two times (2×1 min at 2000 rpm). The paste was further mixed using a rotor-stator homogenizer (model PT 10-35 GT, 9 mm diameter rotor, Kinematicia, Bohemia, N.Y.). The paste was homogenized for 5 min at 9500 rpm. During this time the vial was moved to bring the various portions of the paste into contact with the homogenizer rotor blade. Bubbles were removed using the centrifugal mixer. The paste was cast using a doctor blade (102 mm wide×0.29 mm gate height, Bird Film Applicator Inc., Norfolk, Va.) onto aluminum foil (25 μm thick, 1145-0, Allfoils, Brooklyn Heights, Ohio) using an electric-drive coater (Automatic Drawdown Machine II, Paul N. Gardner Co., Pompano Beach, Fla.). The electrodes were dried for 30 min in a mechanical convection oven (model FDL-115, Binder Inc., Great River, N.Y.). The temperature in the oven was increased from 80° C. to 100° C. during the first 15 min, and held at 100° C. for the 2$^{nd}$ 15 minutes. After drying the composition of the cathode was 90:5:5 wt:wt:wt NMC:pVDF:black. The cathode was placed between brass cover sheets and calendered between 100 mm dia steel rolls to give 57 μm thick cathodes with porosity of approximately 33% and loading of 14 mg NMC/cm$^2$.

Anodes were graphite:pVDF:carbon black (88:7:5 wt:wt:wt) coated on copper foil. The graphite was G5 (CPreme® G5, Conoco-Philips, Huston, Tex.), except for Examples 9 and 10, where the graphite was FSNC-1 (Shanshan Tech, China); the carbon black was C65. The anode coating weight was 7.8 mg graphite/cm$^2$ and the anodes were calendered to a thickness of 75 μm.

Pouch Cells

Cathodes were punched out to 31.3×45 mm$^2$ size and anodes were punched out to 32.4×46.0 mm$^2$. Al and Ni tabs were ultrasonically welded to the current collectors, and single-layer pouch cells were assembled using a foil-polymer laminate pouch material (MTI Corp., Richmond, Calif.). The tabs were sealed into the top of the pouch outside the dry box, leaving the two sides and bottom open. The pouch was dried in the antechamber of a dry box under vacuum overnight at 90° C. Inside the argon-filled dry box, a microporous polyolefin separator (Celgard 2500, Charlotte, N.C.) was placed between the anode and cathode, and the sides sealed. The electrolyte (350 μl) was injected through the bottom, and the bottom edge sealed in a vacuum sealer.

Pouch Cell Evaluation Procedure

The cells were placed in fixtures which applied a pressure of 320 kPa to the electrodes through an aluminum plate fitted with a foam pad. The cells were held in a 25° C. enviromental chamber and evaluated using a battery tester (Series 4000, Maccor, Tulsa, Okla.). In the following procedure, the currents for the C-rates were determined assuming the cell would have a capacity of 170 mAh per g of NMC. Thus currents of 0.05 C, 0.25 C, and 1.0 C were implemented in the tester using, respectively, currents of 8.5, 42.5, and 170 mA per gram of NMC in the cell.

The steps of the procedure were as follows:
1. Overnight wetting at open circuit (OC)
2. 1st charge
3. Aging at OC
4. Bring cell in dry box, open to release formation gas, vacuum reseal
5. Finish remainder of 1st charge
6. Discharge CC at 0.5 C to 3.0V
7. 2nd Cycle: Capacity check (to compare to Retained and Recovered capacities after Storage). 2nd Charge CC of 0.2 C to 4.35V+CV to 0.05 C: Discharge CC at 0.2 C to 3.0V
   Initial Capacity=2$^{nd}$ cycle discharge capacity
8. 3th-6th cycles: Charge CC at 170 mA/g~1 C to 4.35V+CV to 8.5 mA/g; Discharge CC at 1.0 C to 3.0V
9. 7rd Charge CC at 1.0 C 4.35V+CV to 0.05 C
10. Demount from the fixture; Measure the volume of the cell after formation (VF)
11. Store cell at 90° C. for 4 h
12. Measure cell volume after storage (VS); The gas generated during storage was calculated as GS=VS−VF; the gas generated during storage, normalized for cell capacity was calculated as Gas from cycling=GS/Initial Capacity (units cc/Ah)
13. Remount the cell in the fixture; 7th Discharge CC 0.5 C to 3.0V
    Retained Capacity=7$^{th}$ discharge capacity
    Retained %=Retained Capacity/Initial Capacity
14. 8th-9th: 2 Cycles Capacity check: Charge CC 0.2 C to 4.35V+CV to 0.05 C; Discharge CC 0.2 C to 3.0V
    Recovered Capacity=9th discharge capacity
    Recovered %=Recovered Capacity/Initial Capacity Cell Volume Measurement A rectangular beaker (typically 130×27×75 mm HXWXL) was filled with propylene carbonate (PC, density of fluid (df)=1.204 g/cc), the beaker was placed on a balance equipped with a draft shield and located in a chemical fume hood, and the balance tared. Balances used had 600 g capacity and resolutions of either 0.01 g or 0.001 g. A thin thread was attached to the cell with a small piece of Kapton® adhesive tape, the cell suspended (fully immersed) in the PC, and the mass reading of the suspended cell was recorded (ms). For the cell of volume V immersed in a fluid of density df, the fluid exerted an upward buoyant force ms on the cell, which was transmitted to the balance pan as force ms. The volume of the cell V was calculated using Archimedes principle as V=ms/df.

In cases where the 90° C. storage had generated sufficient gas such that the cell floated in the PC, a 304 stainless steel weight of mass mw and density dw=8.00 g/cc was attached to the pouch using a small piece of tape, the balance reading ms of the suspended cell+weight was recorded, and the volume of the cell V was calculated as V=(ms/df)−(mw/dw).

Table 1 below shows the Gas generated during Storage (GS), (calculated as described above) and the Recovered Capacity (Recovered Cap, as described above), for a series of electrolyte formulations. All Examples and Comparative Examples used a difluoroethyl acetate(DFEA)/ethylene carbonate(EC)/LiPF$_6$ base electrolyte (70 solvent wt % DFEA, 30 solvent wt % EC, 1M LiPF$_6$) with specified weight percentages of additives lithium bis(oxalato borate (Li-BOB), 1,3-propane sultone (PS, Sigma-Aldrich Chem.), and/or 1,8-naphthalenesultone (NS, Sigma-Aldrich Chem.). That is, in Example 1 the electrolyte composition contained 98.5 wt % of the base electrolyte, 0.5 wt % LiBOB, and 1% PS. The PS and NS were purified by sublimation before use. 3-Fluoro-1,3-propane sultone (FPS) was synthesized as described in the Materials and Methods section herein. Vinylene carbonate (VC, Sigma-Aldrich Co.) had its BHT inhibitor removed by passing the VC through a short column of alumina.

TABLE 1

Results for Examples 1-18 and Comparative Examples A-E

| Example | Electrolyte Additives | GS (cc/Ah) | Recovered Cap % |
|---|---|---|---|
| 1 | 0.5% LiBOB + 1% PS | 2.81 | 90.76 |
| 2 | 0.5% LiBOB + 1% PS | 2.92 | 91.30 |
| 3 | 2% LiBOB + 2% NS | 5.89 | 90.92 |
| 4 | 2% LiBOB + 2% NS | 7.00 | 90.60 |
| 5 | 2% LiBOB + 2% PS | 5.01 | 94.73 |
| 6 | 2% LiBOB + 2% PS | 4.38 | 94.26 |
| 7 | 2% LiBOB + 1% PS | 7.55 | 91.59 |
| 8 | 2% LiBOB + 1% PS | 7.50 | 91.80 |
| 9 | 0.5% LiBOB + 2% PS | 2.76 | 95.86 |
| 10 | 0.5% LiBOB + 2% PS | 1.74 | 95.27 |
| 11 | 1% PS | 11.37 | 75.87 |
| 12 | 1% PS | 10.91 | 74.23 |
| Comp. Ex. A | 0.5% LiBOB | 8.80 | 84.15 |
| 13 | 2% PS | 8.42 | 79.93 |
| 14 | 2% PS | 8.15 | 80.19 |
| Comp. Ex. B | 0.5% LiBOB | 6.36 | 72.83 |
| 15 | 0.5% LiBOB + 1% VC + 1.5% PS | 0.4 | 95.4 |
| 16 | 0.5% LiBOB + 1% VC + 1.5% PS | 0.2 | 94.7 |
| Comp. Ex. C | 2% LiBOB | 6.4 | 92.1 |
| Comp. Ex. D | 2% LiBOB | 5.9 | 90.1 |
| Comp. Ex. E | none | 13.5 | 75.6 |
| 17 | 0.5% LiBOB + 1% FPS | 3.86 | 72.83 |
| 18 | 0.5% LiBOB + 1% FPS | 2.85 | 88.01 |

Examples 13 and 14 show that, in an electrolyte formulation with fluorinated solvent DFEA, organic carbonate EC, and electrolyte salt LiPF$_6$, addition of PS reduced the the gas relative to the electrolyte without the sultone (Comparative Example E). Examples 1, 2, 9, 10, 17, and 18 show that the gas is even further reduced when sultones PS or FPS are added to electrolyte which also contains LiBOB, in comparison to the electrolytes containing LiBOB but no sultone (Comparative Examples A and B). Examples 9 and 10, and 5 and 6, show that the PS-containing electrolytes have higher recovered capacities than the same electrolytes without the PS (Comparative Examples A and B, and Comparative Examples C and D).

Example 19 and Example 20

Comparative Examples F Through K

Except as noted below, the same procedures were performed as described above for Examples 1-16.
Preparation of the Cathode
Preparation of Primer on Aluminum Foil Current Collector Using a Polyimide/Carbon Composite To prepare the polyamic acid, a prepolymer was first prepared. 20.6 wt % of PMDA:ODA prepolymer was prepared using a stoichiometry of 0.98:1 PMDA/ODA (pyromellitic dianhydride//ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1.

In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1.

5.196 grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer:carbon ratio. A Paasche VL# 3 Airbrush sprayer (Paasche Airbrush Company, Chicago, Ill.) was used to spray this material onto the aluminum foil (25 μm thick, 1145-0, Allfoils, Brooklyn Heights, Ohio). The foil was weighed prior to spraying to identify the necessary coating to reach a desired density of 0.06 mg/cm$^2$. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure below:

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min)

Coating of the Cathode Electroactive Layer Onto the Primed Al Foil
Preparation of the Paste The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0352 g Farasis NMC 111 (Ni, Mn, Co, Farasis Energy, Hayward, Calif.) cathode active powder; 0.3342 g carbon black (Denka uncompressed, DENKA Corp., Japan); 6.0971 g PVDF (polyvinylidene difluoride (Solef® 5130) diluted with 2.1491 g NMP (portion 1)+0.3858 g NMP (portion 2) (Sigma Aldrich). The materials were combined in a ratio of 90:5:5, cathode active powder:PVDF:carbon black, as described below. The final paste contained 44.7 wt % solids. NMC 111 contains approximately equimolar amounts of Ni, Mn, and Co.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm.

The cathode active powder and the second portion of NMP were added and the paste was centrifugally mixed once again at 2000 rpm for 2 minutes. An ultrasonic horn was immersed into the paste and ultrasonic energy was applied for approximately three seconds.

The aluminum foil (25 μm thick, 1145-0, Allfoils, Brooklyn Heights, Ohio) was pretreated with a polyimide/carbon primer as described in the procedure above.

Coating and Calendering the Cathode Electrode

The paste was manually cast using doctor blades with a 5 mil gate height plus 2 mil of Kapton® tape to produce a total gate opening of 7 mils onto the primed aluminum foil. The electrodes were dried for 60 minutes at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar was set to have a nip force (in lb)=37.8×regulator pressure (psi). Loadings of cathode active material were approximately 13.0-13.2 mg/cm².

Preparation of the Anode

The following is a typical procedure used for the preparation of the anodes used in Examples 19 and 20. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

The loading of the anode active component was approximately 8.6-8.8 mg/cm².

Pouch Cells

Cathodes were punched out to 31.3 mm×45 mm size and anodes were punched out to 32.4 mm×46.0 mm. Al and Ni tabs were ultrasonically welded to the current collectors, and single-layer pouch cells were assembled using a foil-polymer laminate pouch material (MTI Corp., Richmond, Calif.). The tabs were sealed into the top of the pouch outside the dry box, leaving the two sides and bottom open. The pouch was dried in the antechamber of the dry box under vacuum overnight at 90° C. Inside the argon-filled dry box, a microporous polyolefin separator (Celgard 2500, Charlotte, N.C.) was placed between the anode and cathode, and the sides sealed. The electrolyte (300 μl) was injected through the bottom, and the bottom edge sealed in a vacuum sealer. The cells were mounted in fixtures which applied 0.32 MPa pressure via a foam pad to the active area of the pouch.

Preparation of Electrolyte

The electrolyte was prepared by combining 70 weight % of 2,2-difluoroethyl acetate and 30 wt % ethylene carbonate (EC, BASF, Independence, Ohio) in a nitrogen purged drybox. Molecular sieves (3A) were added and the mixture was dried to less than 1 ppm water. After filtration with a 0.25 micron PTFE syringe filter, LiPF$_6$ (lithium hexafluorophosphate (BASF, Independence, Ohio) was added to make the formulated electrolyte at 1 M concentration.

For Examples 19 and 20, 1.9203 g of the above formulated electrolyte was combined with 0.0409 g of purified LiBOB, and 0.0400 g of 1,3-propane sultone (Aldrich, Milwaukee, Wis.).

For Comparative Examples F through K, the same procedure was used, except for the following differences. The cathode active loadings and the anode active loadings were approximately 12.4-14.0 mg/cm² and 8.8-9.5 mg/cm², respectively, for Comparative Examples F, G, and H, and 12.1-12.4 mg/cm² and 8.6-8.7 mg/cm², respectively, for Comparative Examples J and K.

For Comparative Examples F, G, and H, the electrolyte compositions were prepared by combining 70 weight % of 2,2-difluoroethyl acetate and 30 wt % ethylene carbonate (EC, BASF, Independence, Ohio) in a nitrogen purged drybox. Molecular sieves (3A) were added and the mixture was dried to less than 1 ppm water. After filtration with a 0.25 micron PTFE syringe filter, LiPF$_6$ (lithium hexafluorophosphate, (BASF, Independence, Ohio) was added to make the formulated electrolyte at 1 M concentration. No additional additives were included.

For the electrolyte compositions of Comparative Examples J and K, the formulated electrolyte was combined with sufficient LiBOB to prepare an electrolyte composition containing 2 weight percent LiBOB.

The cells were charged and the amount of gas formed was measured as described above. The percent volume change is shown in Table 2.

TABLE 2

Results for Examples 19 and 20, and for Comparative Examples F-K

| Example | Additive | Gas Formed (cm³) | Gas Formed (cm³/Ah) | Volume Change (%) |
|---|---|---|---|---|
| Comp. Ex. F | none | 0.53 | 15.56 | 25.84 |
| Comp. Ex. G | none | 0.50 | 14.42 | 24.72 |
| Comp. Ex. H | none | 0.25 | 8.98 | 13.08 |

TABLE 2-continued

Results for Examples 19 and 20, and for Comparative Examples F-K

| Example | Additive | Gas Formed (cm³) | Gas Formed (cm³/Ah) | Volume Change (%) |
|---|---|---|---|---|
| Comp. Ex. J | 2% LiBOB | 0.30 | 9.96 | 14.76 |
| Comp. Ex. K | 2% LiBOB | 0.27 | 9.01 | 13.34 |
| 19 | 2% LiBOB + 2% PS | 0.11 | 3.41 | 5.45 |
| 20 | 2% LiBOB + 2% PS | 0.09 | 2.81 | 4.61 |

The results for Examples 19 and 20 show that adding LiBOB and 1,3-propane sultone to the electrolyte composition decreased the amount of gas formed in the cells.

Comparative Examples L, N, M, and O

Examples 21-32

Cathodes were made as described above for Examples 1-16. The anodes were obtained from Commissariat à l'énergie atomique et aux energies alternatives, Grenoble, France (CEA). The anode composition was 97.4 wt % graphite (Hitachi SMGNHE2) with 2.6% CMC-SBR binder. Anodes were coated from aqueous paste on to both sides of 12 μm thick copper foil, dried, and calendered to a porosity of 30-33%. Single-layer pouch cells of 32 mAh nominal capacity were fabricated as described above for Examples 1-16, except the pouch material used was grade C4 from Showa Denko (Osaka, Japan). Comparative Examples L and M and Examples 21 and 22 differed from the other cells of Table in that they had two separators instead of one, a 50 μm dia nickel wire was introduced between the two separators to act as a third electrode, and the pressure applied through the foam pad was reduced to 150 kPa.

All the cells of Table 3 were filled with 400 μl of electrolyte. All the electrolytes used 1M LiPF$_6$ salt. For Comparative Examples N and O and Examples 23-31, the base electrolyte solvents were first combined, dried over molecular sieves, the LiPF$_6$ salt added, and then the dried and purified additives (listed after the "+" sign in Table 3) were added. For Comparative Examples L and M and Examples 21-22, the indicated components at the weight percentages listed, including PS, were combined first, and then sufficient LiPF$_6$ to make 1 M was added. Fluoroethylene carbonate (4-fluoro-1,3-dioxolan-2-one, FEC), ethyl methyl carbonate (EMC), and diethyl carbonate (DEC) were obtained as battery-grade from BASF. Ethyl propionate (EP) was obtained from Sigma-Aldrich and distilled using a spinning band column. Ethylene sulfate (ES) (Sigma-Aldrich) was purified by dissolving in acetonitrile (AN), drying with molecular sieves, evaporating the AN, and then sublimation under vacuum at 55° C.

The pouch cells were subjected to formation at 25° C. following the Steps 1-8 described herein above. After the 6th cycle, they were transferred to a chamber at 45° C. and subjected to cycling as in Step 8 above. The polarization resistance Rp was calculated by taking the average cell voltage measured between 45% and 55% state of charge while the cell was charging at 1C in the 6th cycle at 45° C., subtracting the average cell voltage between 55% and 45% state of charge while the cell was discharging at 1C, and dividing this difference by twice the current density (in A/cm²) corresponding to 1 C; values are provided in Table 3. Rp is a measure of the resistance of the cell, and lower Rp values are desired. Lower Rp values are associated with increased round-trip energy efficiency (discharge energy/charge energy) of the cell. Cycle life is the number of cycles required to reduce the discharge capacity to 80% of the maximimum capacity obtained in the first 30 cycles.

TABLE 3

Results for Comparative Examples L, M, N, and O and Examples 21-32.

| Example | Electrolyte Composition Base Solvents and Weight Ratio | Additives (wt %) | Rp for Cycle 6 (ohmcm²) | Cycle Life at 45° C. |
|---|---|---|---|---|
| Comp Ex L | EC/EP/EMC/FEC 30:40:20:8 | 2% PS | 41 | 80 |
| Comp Ex M | EC/EP/EMC/FEC 30:40:20:8 | 2% PS | 43 | 107 |
| Comp Ex N | EC/DFEA 30/70 | 1% LiBOB + 2% ES | 37 | 105 |
| Comp Ex O | EC/DFEA 30/70 | 1% LiBOB + 2% ES | 41 | 65 |
| 21 | EC:DFEA:EMC:FEC 30:40:20:8 | 2% PS | 38 | 175 |
| 22 | EC:DFEA:EMC:FEC 30:40:20:8 | 2% PS | 37 | 180 |
| 23 | EC/DFEA 30/70 | 1% LiBOB + 1% PS + 1% ES | 31 | 138 |
| 24 | EC/DFEA 30/70 | 1% LiBOB + 1% PS + 1% ES | 31 | 133 |
| 25 | EC/DFEA 30/70 | 1% LiBOB + 1% PS + 1% ES | 32 | 142 |
| 26 | EC/DFEA 30/70 | 1% LiBOB + 1% PS + 1% ES | 34 | 147 |
| 27 | FEC/DFEA 25/75 | 1% PS | 28 | 242 |
| 28 | FEC/DFEA 25/75 | 1% PS | 31 | 172 |
| 29 | FEC/DFEA 25/75 | 1% LiBOB + 1% PS | 32 | 212 |
| 30 | FEC/DFEA 25/75 | 1% LiBOB + 1% PS | 33 | 239 |
| 31 | FEC/DFEA 25/75 | 1% ES + 1% PS | 33 | 250 |
| 32 | FEC/DFEA 25/75 | 1% ES + 1% PS | 32 | 207 |

In general, the electrolyte compositions of Examples 21-32 have lower Rp than that of the Comparative Examples L, M, N, and O having the same base solvents. Specifically, when the non-fluorinated ester EP in Comparative Examples L and M was replaced by the fluorinated ester DFEA, the Rp decreased from 41-43 to the range of 37-38 ohmcm² and the cycle life increased by 90%. When the additive mixture of 1% LiBOB+2% ES (Comparative Examples N and O) had half of the ES replaced by PS to give an additive mixture of 1% LiBOB+1% ES+1% PS (Example 26), the Rp was reduced from 37-41 into the range 31-34 and the cycle life increased (on average) by 65%. When the organic carbonate EC was replaced by the organic carbonate FEC in Examples 27-32, further increases in cycle life were obtained.

Comparative Example P

Example 33

Cathode Preparation
Preparation of LiMn$_{1.5}$Ni$_{0.45}$Fe$_{0.05}$O$_4$ (Fe-LNMO) Cathode Active Material The following is a typical procedure used for the preparation of the cathode active material used in Comparative Example P and Example 33.

For the preparation of LiMn$_{1.5}$Ni$_{0.45}$Fe$_{0.05}$O$_4$, 401 g manganese (II) acetate tetrahydrate (Aldrich, Milwaukee Wis., Product No. 63537), 125 g nickel (II) acetate tetrahydrate (Aldrich, Product No. 72225) and 10 g iron (II) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Preparation of primer on aluminum foil current collector using a polyimide/carbon composite was performed as described herein above for Examples 19 and 20.

Preparation of the Paste

The following is a typical procedure used to prepare cathodes. The binder was obtained as a 5.5% solution of polyvinylidene fluoride in N-methylpyrrolidone (Solef® 5130 (Solvay, Houston, Tex.)). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder:PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, Calif.) two times, for 60 s at 2000 rpm each time. The cathode active powder and the 2nd portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, N.Y.) was inserted into the vial. The gap between the vial top and the stator was wrapped with aluminum foil to minimize water ingress into the vial. The resulting paste was homogenized for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 μm thick, 1145-0, Allfoils, Brooklyn Heights, Ohio) using an automatic coater (AFA-II, MTI Corp., Richmond, Calif.). The electrodes were dried for 30 min at 95° C. in a mechanical convection oven (model FDL-115, Binder Inc., Great River, N.Y.). The resulting 51-mm wide cathodes were placed between 125 mm thick brass sheets and passed through a calender three times using 100 mm diameter steel rolls at ambient temperature with nip forces increasing in each of the passes, starting at 260 kg with the final pass at 770 kg. Loadings of cathode active material were 7 to 8 mg/cm$^2$.

Representative Anode Preparation

The following is a typical procedure used to prepare anodes. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid: PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg. Loadings of anode active material were 3 to 4 mg/cm$^2$.

Preparation of Electrolytes

The 2,2-difluoroethyl acetate was prepared as described herein above. Lithium bis(oxalato)borate was purified as described for the Examples in Table 1.

The electrolyte was prepared by combining 70 weight percent of 2,2-difluoroethyl acetate and 30 weight percent ethylene carbonate (EC, BASF, Independence, Ohio) in a nitrogen purged drybox. Molecular sieves (3A) were added and the mixture was dried to less than 1 ppm water. After filtration with a 0.25 micron PTFE syringe filter, $LiPF_6$ (lithium hexafluorophosphate, BASF, Independence, Ohio) was added to make the formulated electrolyte at 1 M concentration. This electrolyte composition was used in Comparative Example P.

1.88 g of the above mixture was combined with 0.04 g of purified LiBOB, 0.04 g of fluorethylene carbonate, and 0.04 g of propane sultone to create the electrolyte formulation of Example 33.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Formation at 25° C.

The coin cells were cycled twice for formation using a commercial battery tester (Series 4000, Maccor, Tulsa, Okla.) at ambient temperature using constant current charging and discharging between voltage limits of 3.4-4.9 V and using constant currents (CC) of 12 mA per g of cathode active material.

Coin Cell Evaluations at 55° C.

Following the formation procedure, the cells were placed in an oven at 55° C. and cycled using constant current charging and discharging between voltage limits of 3.4-4.9 V at a current of 240 mA per gram of cathode active material, which is approximately a 2C rate for 250 cycles.

For the coin cells containing the electrolyte compositions of Comparative Example P and Example 33, the discharge capacity retention at 250 cycles at 55° C. is given in Table 4 as a percentage of the as-fabricated cell capacity. The as-fabricated cell capacity was calculated by multiplying the mass of cathode active material by 120 mAh/g, which is the mass-normalized capacity of the cathode active material.

TABLE 4

Capacity Retention from Coin Cell Cycling Data for Comparative Example P and Example 33.

| Example | Additives | Coin Cell | Capacity Retention at 250 Cycles (%) | Average % Capacity Retention at 250 Cycles (mAh/g) |
|---|---|---|---|---|
| Comp. Ex. P | none | P-1 | 37.60 | 37.79 |
| | | P-2 | 37.04 | |
| | | P-3 | 38.71 | |
| 33 | 2 wt % LiBOB, 2 wt % FEC, 2 wt % propane sultone | 33-1 | 57.92 | 57.50 |
| | | 33-2 | 56.08 | |
| | | 33-3 | 58.50 | |

The results in Table 4 show that the use of 2 weight percent each of LiBOB, FEC, and propane sultone with a base solvent of 70/30 2,2-difluoroethyl acetate/ethylene carbonate containing 1 M $LiPF_6$ provided greatly improved capacity retention.

Examples 34a and 34b

70/30 DFEA/FEC+2 wt % LiBOB+2 wt % 1,3-propanesultone

Materials:

The 2,2-difluoroethyl acetate (DFEA) used in the following Examples and Comparative Examples was prepared as described herein above.

A representative procedure used for purification of lithium bis(oxalato)borate is as follows. In a nitrogen purged dry box, lithium bis(oxalato)borate (LiBOB, Sigma Aldrich, 757136-25G) was purified using the following procedure. 25 grams of LiBOB were added to a 500 mL Erlenmeyer flask equipped with a Teflon-coated stir bar. To this, 125 mL of anhydrous acetonitrile (Sigma Aldrich, Fluka, molecular sieves) was added. The flask was heated at 45° C. for 10 minutes using an oil bath. The mixture was filtered through a fine-pore glass frit (Chemglass, F, 60 mL) into a 500 mL filter flask with the use of vacuum. The solution was allowed to cool to room temperature, forming a clear solution, and 125 mL of cold toluene (from freezer at −25° C., Sigma Aldrich CHROMASOLV®) was added. Immediate precipitation was observed and this mixture was allowed to sit for 20 minutes to allow additional solid formation. The solution was filtered through a fine-pore glass frit (Chemglass, F, 60 mL) into a 500 mL round bottom. The filter cake was washed with cold anhydrous toluene (2×20 mL) and using a glass funnel, transferred to a cylindrical long neck flask. This flask was capped tightly, removed from the glove box, and attached to a Kugelrohr, which was subsequently attached to a high vacuum. This flask was dried under high vacuum (60-100 mtorr) at room temperature overnight, and then at 140° C. under high vacuum (60-80 mtorr) for an additional three days. At this time, the flask was capped and returned to the dry box for all further handling.

Purification of 1,3-propane Sultone (PS)

1,3-propane sultone (Aldrich, Milwaukee, Wis.) was further purified by the following procedure. 5 g of 1,3-propane sultone (Aldrich, Milwaukee, Wis.) was charged to a dried glass sublimator. The pressure was lowered to ~1.8 torr. Dry ice was added to the cold finger. The sublimator was heated in a 75° C. oil bath for approximately 3 hours. The sublimator was transferred to a nitrogen dry box and disassembled to harvest the purified 1,3-propane sultone.

Synthesis of 2,2-Difluoroethyl Methyl Carbonate (DFEMC)

A solution of 404 mL 2,2-difluoroethanol (DFE; 525 g; 6.40 mol; mw=82.05; D=1.30; bp=95° C.; Synquest 2101-3-02) and 11.6 g 4-(dimethylamino)pyridine (DMAP; 94.9 mmol; 1.5 mol %; mw=122.17; Aldrich 107700) in 4644 mL dichloromethane (DCM) was cooled via a circulating chiller as it stirred under nitrogen in a 20-L jacketed flask with bottom let-down valve, a condenser, overhead stirrer and a dropping funnel. Aqueous NaOH (441 mL; 50 wt % NaOH; 8.3 mol; 30% excess; 0.75 g NaOH/mL; 18.8 M; D=1.52; Aldrich 415413) was added all at once and the mixture was stirred and chilled to 1° C. The mixture was stirred rapidly as 584 mL cold methyl chloroformate (MCF, 712 g; 7.54 mol; 18% excess; mw=94.50; D=1.22; bp=70° C., Aldrich M35304) was added at 5-10 mL/min. The chiller was set at −20° C. to maintain the reaction temperature at 2-3° C. After about half the MCF had been added, the salts in the aqueous phase crystallized and, in the absence of liquid aqueous NaOH, the reaction essentially stopped. Water (300 mL) was added to liquify the salts and the reaction proceeded again. When the MCF had all been added (1.5 hr total addition time), the dichloromethane solution was sampled and analyzed by gas chromatography (30-m DB-5; 30° C./5 min, then 10° C./min; He: 13.8 cc/min): 0.97 min (0.006%, DFE); 1.10 min (61.019%, DCM); 1.92 min (0.408%, dimethyl carbonate, DMC); 4.38 min (38.464%, 2,2-difluoroethyl methyl carbonate, DFEMC). DFEMC:DFE=6410; DFEMC: DMC=94. The dichloromethane product solution was drawn off via the bottom valve and the flask was washed out with water; the dichloromethane solution was then returned to the flask and was stirred sequentially with 2×750 mL 5% hydrochloric acid followed by 1.5 L sat sodium bicarbonate and finally dried with magnesium sulfate.

The dichloromethane was distilled off at ~40° C./500 torr from a 5-L flask through a 12" empty column topped with a simple still head. Then the residual pot material was distilled at 100°/250 torr to yield 866 g crude 2,2-difluoroethyl methyl carbonate; GC analysis showed DFE 0.011%; DCM 4.733%; DMC 0.646%; DFEMC 94.568%; bis(2,2-difluoroethyl) carbonate (BDFEC) 0.043%. This is a 91% yield of 2,2-difluoroethyl methyl carbonate. The crude DFEMC was redistilled from a 95-113° bath at 285 torr through an 18" glass column packed with 0.16-in SS316 mesh saddles. Fractions 7-10 distilled at about 90° C./285 torr from a 105-113° C. bath. GC-FID analysis of these fractions is provided in Table 5. The pot (25 g) was mostly BDFEC.

TABLE 5

Distillation Fraction Composition by GC-FID Analysis

| Fraction | DFE % | DMC % | DFEMC % | BDFEC % | Yield, g |
|---|---|---|---|---|---|
| 7 | 0.0089 | 0.8403 | 99.0496 | 0.0500 | 501 |
| 8 | 0.0019 | 0.0023 | 99.9283 | 0.0522 | 128 |
| 9 | 0.0094 | 0.0300 | 99.3358 | 0.5787 | 61 |
| 10 | 0.0110 | — | 99.0150 | 0.9240 | 11 |

Fractions 7-9 were combined and distilled under partial vacuum (70 torr) from a 100° C. oil bath through a 20-cm× 2.2 cm column packed with 0.16-in SS316 mesh saddles (Ace Glass 6624-04) in four fractions: #1 (23 g), #2 (20 g), #3 (16 g) and #4 (13 g), to remove DFE. The DFE content of the distillates was analyzed by GC: #1 (0.100%), #2 (0.059%), #3 (0.035%) and #4 (0.026%). The pot material (602 g) was analyzed by GC-FID: DFE 0.0016%; DMC 0.1806%; DFEMC 99.6868%; BDFEC 0.1132%. The sum of DMC, DFEMC and BDFEC accounted for 99.9808% of the product, which contained 16 ppm DFE. The product also contained 18 ppm water by Karl-Fischer titration.

Preparation of the Cathode

Preparation of primer on aluminum foil current collector using a polyimide/carbon composite was performed as described for Examples 19 and 20.

Coating of the cathode electroactive layer onto the primed Al foil

Preparation of the Paste

The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0410 g Farasis 1,1,1 NMC (NiCoMg, Farasis Energy, Hayward, Calif.) cathode active powder; 0.3332 g carbon black (Denka uncompressed, DENKA Corp., Japan); 6.1100 g PVDF (polyvinylidene difluoride) solution; and 2.1501 g (portion 1)+0.3900 g NMP (portion 2) (Sigma Aldrich). The materials were combined in a ratio of 90:5:5, cathode active powder:PVDF:carbon black, as described below. The final paste contained 44.7 wt % solids.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the $2^{nd}$ portion of NMP were added and the paste was centrifugally mixed once again at 2000 rpm for 2 minutes. The paste was then immersed in a sonic horn for 3 seconds.

The aluminum foil (25 μm thick, 1145-0, Allfoils, Brooklyn Heights, Ohio) was pretreated with a polyimide/carbon primer.

Coating and Calendaring the Cathode Electrode

The paste was manually cast using doctor blades with a 5 mil gate height plus ½ mil of Kapton® tape onto the primed aluminum foil. The electrodes were dried for 60 min at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar is set to have a nip force (in Ib)=37.8×regulator pressure (psi). Loadings of cathode active material were approximately 6.2-6.59 mg/cm$^2$.

Preparation of the Anode

Anodes were prepared as described for Examples 19 and 20. The loading of the anode active component was approximately ~4.06-4.17 mg/cm$^2$.

Electrolyte Preparation

The electrolyte was prepared by combining 12.6111 g of 2,2-difluoroethyl acetate and 5.4012 g of fluoroethylene carbonate (FEC, BASF, Independence, Ohio) in a nitrogen purged drybox to create a 70/30 wt %/wt % blend of the two components. Molecular sieves (3A) were added and the mixture was dried to less than 1 ppm water as determined by Karl Fischer titrations. After filtration with a 0.25 micron PTFE syringe filter, 14.8463 g of this mixture was combined with 1.878 g LiPF$_6$ (lithium hexafluorophosphate, (BASF, Independence, Ohio) was added.

2.8804 g of the mixture described above was combined with 0.0605 g of LiBOB and 0.0600 g of 1,3-propane sultone to prepare the formulated electrolyte composition 70/30 DFEA/FEC/1M LiPF$_6$+2 wt % LiBOB+2 wt % PS.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Evaluations at 25° C.

The coin cells were cycled twice for formation using a commercial battery tester (Series 4000, Maccor, Tulsa, Okla.) at ambient temperature using constant current charging and discharging between voltage limits of 3.0-4.6 V at a current of 17.5 mA per gram of cathode active material, which is approximately a 0.1 C rate. Following this procedure, the coin cells were transferred to a 45° C. chamber and cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material).

Capacity retention from coin cell cycling data is presented in Table 6 as Cycle Life 80% and Cap Disc Cy10 (mAh/g). Cycle life is the number of cycles required to reduce the discharge capacity to 80% of the maximum capacity obtained in the first 30 cycles. Cap Disc C is the discharge capacity at cycle 10.

Examples 35a and 35b

70/30 DFEA/FEC with 1M LiPF$_6$+2 wt % LiBOB+2 wt % PS

The same procedures as described in Examples 34a and 34b were used, with the following exceptions. The electrolyte was prepared by combining 12.6111 g of 2,2-difluoroethyl acetate and 5.4012 g fluoroethylene carbonate (FEC, BASF, Independence, Ohio) in a nitrogen purged drybox to create a 70/30 wt %/wt % blend of the two components. Molecular sieves (3A) were added and the mixture was dried to less than 1 ppm water. After filtration with a 0.25 micron PTFE syringe filter, LiPF$_6$ (BASF, Independence, Ohio) was added.

5.7612 g of the mixture described above was combined with 0.1212 g of LiBOB and 0.1207 g of 1,3-propane sultone to prepare the formulated electrolyte composition.

The cathode active loading was 6.02-6.59 mg/cm$^2$; the anode active loading was 4.06-4.17 mg/cm$^2$.

Coin cell cycling results are given in Table 6.

Comparative Examples Q-1 and Q-2

70/30 DFEA/FEC with 1M LiPF$_6$

The same procedures as described in Examples 34a and 34b were used, with the following exceptions. The electrolyte was prepared by combining 12.6111 g of 2,2-difluoroethyl acetate and 5.4012 g fluoroethylene carbonate (FEC, BASF, Independence, Ohio) in a nitrogen purged drybox to create a 70/30 wt %/wt % blend of the two components. Molecular sieves (3A) were added and the mixture was dried to less than 1 ppm water. After filtration with a 0.25 micron PTFE syringe filter, LiPF$_6$ (BASF, Independence, Ohio) was added to prepare the electrolyte composition.

The cathode active loading was 6.24-6.73 mg/cm$^2$; the anode active loading was 4.01-4.17 mg/cm$^2$.

Coin cell cycling results are given in Table 6.

Example 36

75/25 DFEMC/FEC with 1M LiPF$_6$+2 wt % LiBOB+2 wt % PS

The same procedure that was described in Examples 34a and 34b was used, with the following differences. The electrolyte was prepared by combining 10.1630 g of difluoroethyl methyl carbonate and 3.3832 g fluoroethylene carbonate (FEC, BASF, Independence, Ohio) in a nitrogen purged drybox to create a 75/25 wt %/wt % blend. Molecular sieves (3A) were added and the mixture was dried to less than 1 ppm water. After filtration with a 0.25 micron PTFE syringe filter, 12.3854 g of this mixture was combined with 1.3866 g of LiPF$_6$ (BASF, Independence, Ohio).

2.8812 g of the mixture described above was combined with 0.0611 g of LiBOB and 0.0604 g of 1,3-propane sultone to prepare the formulated electrolyte composition.

The cathode active loading was 6.95 mg/cm$^2$; the anode active loading was 4.06 mg/cm$^2$.

Coin cell cycling results are given in Table 6.

Comparative Examples R-1 and R-2

75/25 DFEMC/FEC with 1M LiPF$_6$

The same procedure that was described in Examples 34a and 34b was used, with the following differences. The electrolyte was prepared by combining 10.1630 g of difluoroethyl methyl carbonate and 3.3822 g fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, 12.3854 g of this mixture was combined with 1.3866 g of LiPF$_6$ (BASF, Independence, Ohio) to prepare the electrolyte composition.

The cathode active loading was 6.73-6.88 mg/cm$^2$; the anode active loading was 4.28-4.55 mg/cm$^2$.

Coin cell cycling results are given in Table 6.

Examples 37a and 37b

75/25 DFEA/FEC with 1M LiPF$_6$+1 wt % LiBOB+2 wt % PS

The same procedure that was described in Examples 34a and 34b was used, with the following differences. The electrolyte was prepared by combining 13.3888 g of 2,2-difluoroethyl acetate and 4.4620 g fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, 16.5675 g of this mixture was combined with 2.1135 g LiPF$_6$ (BASF, Independence, Ohio).

1.9417 g of the mixture described above was combined with 0.0211 g of LiBOB and 0.0404 g of 1,3-propane sultone to prepare the formulated electrolyte composition.

The cathode active loading was 6.17 mg/cm$^2$; the anode active loading was 4.01-4.17 mg/cm$^2$.

Coin cell cycling results are given in Table 6.

Exampel 38

75/25 DFEA/FEC with 1M LiPF$_6$+2 wt % LiBOB+1 wt % PS

The same procedure that was described in Examples 34a and 34b was used, with the following differences. The electrolyte was prepared by combining 13.3888 g of 2,2-difluoroethyl acetate and 4.4620 g fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, 16.5675 g of this mixture was combined with 2.1135 g LiPF$_6$ (BASF, Independence, Ohio).

1.9407 g of the mixture described above was combined with 0.0410 g of LiBOB and 0.0220 g of 1,3-propane sultone to prepare the formulated electrolyte composition.

The cathode active loading was 6.31 mg/cm$^2$; the anode active loading was 4.06 mg/cm$^2$.

Coin cell cycling results are given in Table 6.

Example 39

75/25 DFEA/FEC with 1M LiPF$_6$+1 wt % LiBOB+1 wt % PS

The same procedure that was described in Examples 34a and 34b was used, with the following differences. The electrolyte was prepared by combining 13.3888 g of 2,2-difluoroethyl acetate and 4.4620 g fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, 16.5675 g of this mixture was combined with 2.1135 g LiPF$_6$ (BASF, Independence, Ohio).

1.9611 g of the mixture described above was combined with 0.0204 g of LiBOB and 0.0214 g of 1,3-propane sultone to prepare the formulated electrolyte composition.

The cathode active loading was 6.31 mg/cm$^2$; the anode active loading was 4.06 mg/cm$^2$.

Coin cell cycling results are given in Table 6.

Comparative Examples S-1, S-2, and S-3

75/25 DFEA/FEC with 1M LiPF$_6$

The same procedure that was described in Examples 34a and 34b was used, with the following differences. The electrolyte was prepared by combining 13.3888 g of 2,2-difluoroethyl acetate and 4.4620 g fluoroethylene carbonate (FEC, BASF, Independence, Ohio) in a nitrogen purged drybox. Molecular sieves (3A) were added and the mixture was dried to less than 1 ppm water. After filtration with a 0.25 micron PTFE syringe filter, 16.5675 g of this mixture was combined with 2.1135 g LiPF$_6$ (BASF, Independence, Ohio).

The cathode active loading was 6.3-6.73 mg/cm$^2$; the anode active loading was 4.12-4.39 mg/cm$^2$.

Coin cell cycling results are given in Table 6.

Examples 40a and 40b

37.5/37.5/25 DFEA/DFEMC/FEC with 1M LiPF$_6$+2 wt % LiBOB+2 wt % PS

The same procedure that was described in Examples 34a and 34b was used, with the following differences. 2,2-Difluoroethyl acetate (7.1220 g), 2,2-difluoroethyl methyl carbonate (7.1269 g), and fluoroethylene carbonate (4.7560 g) (FEC, BASF, Independence, Ohio) were combined in a nitrogen purged drybox. Molecular sieves (3A) were added and the solution was dried to less than 1 ppm water. The solution was filtered with a 0.25 micron PTFE syringe filter.

To 5 grams of this solution were added 0.1168 g of LiBOB and 0.1165 g of 1,3-propane sultone. After the additives dissolved, 0.5995 g of LiPF$_6$ (BASF, Independence, Ohio) was then added to form the electrolyte composition.

The cathode active loading was 6.31 mg/cm$^2$; the anode active loading was 4.06-4.28 mg/cm$^2$.

Coin cell cycling results are given in Table 6.

Examples 41a and 41b

30/30/25/15 DFEA/DFEMC/FEC/DMC+2 wt % LiBOB+2 wt % PS

The same procedure that was described in Examples 34a and 34b was used, with the following differences. 2,2-Difluoroethyl acetate (5.5161 g), 2,2-difluoroethyl methyl carbonate (5.5203 g), fluoroethylene carbonate (4.5914 g) (FEC, BASF, Independence, Ohio), and dimethyl carbonate (2.7513 g) (BASF, Independence, Ohio) were combined in an Argon purged drybox. Molecular sieves (3A) were added and the solution was dried to less than 1 ppm water. The solution with filtered with a 0.25 micron PTFE syringe filter To 5 grams of this solution were added 0.1170 g of LiBOB and 0.1170 g of 1,3-propane sultone. After the additives dissolved, 0.6197 g of LiPF$_6$ (BASF, Independence, Ohio) was then added to form the electrolyte composition.

The cathode active loading was 6.02-6.45 mg/cm$^2$; the anode active loading was 4.06-4.22 mg/cm$^2$.

Coin cell cycling results are given in Table 6.

Comparative Examples T-1 and T-2

28/28/30/14 DFEA/DFEMC/FEC/DMC with 1M LiPF$_6$

The same procedure that was described in Examples 34a and 34b was used, with the following differences. 2,2-Difluoroethyl acetate (5.1857 g), 2,2-difluoroethyl methyl carbonate (5.1873 g), fluoroethylene carbonate (5.5571 g) (FEC, BASF, Independence, Ohio), and dimethyl carbonate (2.5999 g) (BASF, Independence, Ohio) were combined in an Argon purged drybox. Molecular sieves (3A) were added and the solution was dried to less than 1 ppm water. The solution with filtered with a 0.25 micron PTFE syringe filter and LiPF$_6$ added to 1M.

The cathode active loading was 7.28-7.50 mg/cm$^2$; the anode active loading was 4.01-4.17 mg/cm$^2$.

Coin cell cycling results are given in Table 6.

TABLE 6

Results for Examples 34-41 and Comparative Examples Q-T

| Example | Base Solvents and Weight Ratio | Additives (wt %) | Cycle Life 80% | Cap Disc Cy10 (mAh/g) |
|---|---|---|---|---|
| 34a | 70 wt % DFEA, | 2 wt % LiBOB + | 283 | 171 |
| 34b | 30 wt % FEC | 2 wt % PS | 365 | 183 |
| 35a | 70 wt % DFEA, | 2 wt % LiBOB + | 388 | 166 |
| 35b | 30 wt % FEC | 2 wt % PS | 330 | 167 |
| Comp Ex Q-1 | 70 wt % DFEA, | — | 115 | 176 |
| Comp Ex Q-2 | 30 wt % FEC | | 112 | 171 |
| 36 | 75 wt % DFEMC, 25 wt % FEC | 2 wt % LiBOB + 2 wt % PS | 623 | 188 |
| Comp Ex R-1 | 75 wt % DFEMC, 25 wt % FEC | — | 269 | 177 |
| Comp Ex R-2 | | | 225 | 170 |
| 37a | 75 wt % DFEA, | 1 wt % LiBOB + | 368 | 170 |
| 37b | 25 wt % FEC | 2 wt % PS | 371 | 168 |
| 38 | 75 wt % DFEA, 25 wt % FEC | 2 wt % LiBOB + 1 wt % PS | 402 | 175 |
| 39 | 75 wt % DFEA, 25 wt % FEC | 1 wt % LiBOB + 1 wt % PS | 308 | 179 |
| Comp Ex S-1 | 75 wt % DFEA, | — | 111 | 189 |
| Comp Ex S-2 | 25 wt % FEC | | 136 | 180 |
| Comp Ex S-3 | | | 137 | 181 |
| 40a | 37.5 wt % DFEA, | 2 wt % LiBOB + | 146 | 168 |
| 40b | 37.5 wt % DFEMC, 25 wt % FEC | 2 wt % PS | 404 | 173 |
| 41a | 30 wt % DFEMC, 30 wt % DFEA, 15 wt % DMC, 25 wt % FEC | 2 wt % LiBOB + 2 wt % PS | 355 | 186 |
| 41b | | | 371 | 172 |
| Comp Ex T-1 | 28 wt % DFEA, | — | 296 | 176 |
| Comp Ex T-2 | 28 wt % DFEMC, 14 wt % DMC, 30 wt % FEC | | 296 | 176 |

Table 6 describes the results from the battery evaluations. The column labeled "Cycle life 80%" shows the number of discharge/charge cycles which are needed for the cell to reach 80% of its initial capacity, and is a measure of cycle life durability. The column labeled "Cap Disc Cy10" shows the discharge capacity of the cell, in mAh/g, at the tenth discharge cycle. As described above, the cells were cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material)

Examples 34-41 are formulations which contain both LiBOB and 1,3 propane sultone additives.

Compared to Examples 34a, 34b, 35a, and 35b, Comparative Examples Q-1 and Q-2 show the performance of the electrolyte without the LiBOB and PS additives. The cycle life is diminished by more than 50 percent when these additives are not included, showing the benefit of the propane sultone-containing formulations.

Similarly, Example 36 and can be compared to Comparative Examples R-1 and R-2, which do not contain the additives. Once again, the cycle life durability is improved by a factor of two when the 1,3 propane sultone is added.

Also, Examples 37a, 37b, 38, and 39 all show 2.7× to 3× improved cycle life durability compared with that of Comparative Examples S-1, S-2 and S-3, which use the same DFEA/FEC solvent blend but do not include the LiBOB and 1,3-propane sultone additives.

Finally, Examples 41a and 41b utilize a fluorinated solvent mixture blend (DFEMC,DFEA, and FEC with non-fluorinated DMC) and show approximately 20-35% improved cycle life durability when the 1,3 propane sultone containing additives are used.

What is claimed is:

1. An electrochemical cell comprising:
    (a) a housing;
    (b) an anode and a cathode disposed in said housing and in ionically conductive contact with one another;
    (c) an electrolyte composition comprising:
        i) from about 10 to about 80 weight percent, based on the total weight of the electrolyte composition, of a fluorinated acyclic carboxylic acid ester represented by the formula $R^1$—COO—$R^2$, wherein $R^1$ is H, an alkyl group, or a fluoroalkyl group, $R^2$ is an alkyl group or a fluoroalkyl group, either or both of $R^1$ and $R^2$ comprises fluorine, and $R^1$ and $R^2$, taken as a pair, comprises at least two carbon atoms but not more than seven carbon atoms;
        ii) from about 10 to about 80 weight percent, based on the total weight of the electrolyte composition, of an organic carbonate, selected from the group consisting of ethylene carbonate, ethyl methyl carbonate, dimethyl carbonate, diethyl carbonate, vinylene carbonate, propylene carbonate, fluoroethylene carbonate, or mixtures thereof;
        iii) from about 0.01 to about 10 weight percent, based on the total weight of the electrolyte composition, of a sultone represented by the formula

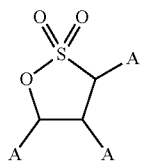

wherein each A is independently a hydrogen, fluorine, or an optionally fluorinated alkyl, vinyl, allyl, acetylenic, or propargyl group; and
        iv) at least one electrolyte salt;
    wherein the composition is disposed in said housing and providing an ionically conductive pathway between said anode and said cathode; and
    (d) a porous separator between said anode and said cathode,
    wherein the electrochemical cell is a liquid electrolyte chemical cell.

2. The electrolyte composition of claim 1, wherein $R^1$ and $R^2$ taken as a pair, further comprises at least two fluorine atoms, with the proviso that none of $R^1$ or $R^2$ contains a —$CH_2F$ or —CHF— group.

3. The electrolyte composition of claim 1, wherein the fluorinated solvent comprises 2,2-difluoroethyl acetate.

4. The electrolyte composition of claim 1, wherein the sultone comprises 1,3-propane sultone.

5. The electrolyte composition of claim 1, further comprising a borate selected from the group consisting of lithium bis(oxalato)borate, lithium difluoro(oxalato)borate, lithium tetrafluoroborate, and mixtures thereof.

6. The electrolyte composition of claim 1 comprising 2,2-difluoroethyl acetate, ethylene carbonate, and 1,3-propane sultone, and further comprising lithium bis(oxalato)borate.

7. The electrolyte composition of claim 1 comprising 2,2-difluoroethyl acetate, 4-fluoroethylene carbonate, and 1,3-propane sultone.

8. The electrolyte composition of claim 7, further comprising 2,2-difluoroethyl methyl carbonate.

9. The electrolyte composition of claim 1 comprising 2,2-difluoroethyl methyl carbonate, 4-fluoroethylene carbonate, and 1,3-propane sultone.

10. The electrolyte composition of claim 1 comprising 2,2-difluoroethyl methyl carbonate, ethylene carbonate, and 1,3-propane sultone.

11. The electrochemical cell of claim 1, wherein said electrochemical cell is a lithium ion battery.

12. The electrochemical cell of claim 11 wherein the anode active material is lithium titanate, graphite, lithium alloys, silicon, or combinations thereof.

13. The electrochemical cell of claim 11, wherein the cathode comprises a cathode active material exhibiting greater than 30 mAh/g capacity in the potential range greater than 4.6 V versus a $Li/Li^+$ reference electrode, or a cathode active material which is charged to a potential greater than or equal to 4.1 V versus a $Li/Li^+$ reference electrode.

14. The electrochemical cell of claim 11, wherein the cathode comprises

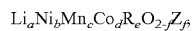

wherein:
    R is Al, Ni, Co, Mn, Cr, Fe, Mg, Sr, V, Zr, Ti, a rare earth element, or a combination thereof;
    Z is F, S, P, or a combination thereof; and
    $0.8 \leq a \leq 1.2$, $0.1 \leq b \leq 0.9$, $0.0 \leq c \leq 0.7$, $0.05 \leq d \leq 0.4$, $0 \leq e \leq 0.2$; wherein the sum of b+c+d+e is about 1; and $0 \leq f \leq 0.08$.

15. The electrochemical cell of claim 11, wherein the cathode comprises a composite material represented by the structure of Formula:

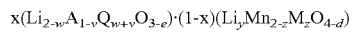

wherein:
x is about 0 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

16. The electrochemical cell of claim 11, wherein the cathode comprises:

$$Li_aA_{1-b}R_bD_2,$$

wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
$0.90 \leq a \leq 1.8$ and $0 \leq b \leq 0.5$.

17. The electrochemical cell of claim 11, wherein the cathode comprises:

$$Li_aA_{1-x}R_xDO_{4-f}Z_f,$$

wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

18. An electronic device, transportation device, or telecommunications device, comprising an electrochemical cell according to claim 1.

19. A method for reducing gas formation in a lithium ion battery, the method comprising:
(a) preparing an electrolyte composition comprising:
i) from about 10 to about 80 weight percent, based on the total weight of the electrolyte composition, of a fluorinated acyclic carboxylic acid ester represented by the formula $R^1$—COO—$R^2$, wherein $R^1$ is H, an alkyl group, or a fluoroalkyl group, $R^2$ is an alkyl group or a fluoroalkyl group, either or both of $R^1$ and $R^2$ comprises fluorine, and $R^1$ and $R^2$, taken as a pair, comprises at least two carbon atoms but not more than seven carbon atoms;
ii) from about 10 to about 80 weight percent, based on the total weight of the electrolyte composition, of an organic carbonate, selected from the group consisting of ethylene carbonate, ethyl methyl carbonate, dimethyl carbonate, diethyl carbonate, vinylene carbonate, propylene carbonate, fluoroethylene carbonate, or mixtures thereof;
iii) from about 0.01 to about 10 weight percent, based on the total weight of the electrolyte composition, of a sultone represented by the formula

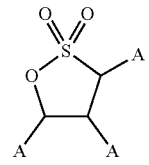

wherein each A is independently a hydrogen, fluorine, or an optionally fluorinated alkyl, vinyl, allyl, acetylenic, or propargyl group; and
iv) at least one electrolyte salt;
(b) placing the electrolyte composition in a liquid electrolyte lithium ion battery comprising
(i) a housing;
(ii) an anode and a cathode disposed in said housing and in ionically conductive contact with one another; and
(iii) a porous separator between said anode and said cathode;
whereby the electrolyte composition provides an ionically conductive pathway between said anode and said cathode;
(c) forming the liquid electrolyte lithium ion battery; and
(d) charging and discharging the liquid electrolyte lithium ion battery at least once.

* * * * *